United States Patent
Ramkumar et al.

(10) Patent No.: US 10,123,278 B2
(45) Date of Patent: Nov. 6, 2018

(54) TECHNIQUES AND APPARATUSES FOR ADJUSTING TRANSMISSION POWER FOR POWER-LIMITED UPLINK CARRIER AGGREGATION SCENARIOS

(71) Applicant: QUALCOMM Incorporated, San Diego, CA (US)

(72) Inventors: Vasanth Kumar Ramkumar, San Diego, CA (US); Pritesh Vora, San Diego, CA (US); Hongbo Yan, Vista, CA (US); Parthasarathy Krishnamoorthy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/788,567

(22) Filed: Oct. 19, 2017

(65) Prior Publication Data

US 2018/0139702 A1 May 17, 2018

Related U.S. Application Data

(60) Provisional application No. 62/421,748, filed on Nov. 14, 2016.

(51) Int. Cl.
H04W 52/16 (2009.01)
H04W 52/28 (2009.01)
(Continued)

(52) U.S. Cl.
CPC ......... *H04W 52/16* (2013.01); *H04W 52/281* (2013.01); *H04W 52/34* (2013.01);
(Continued)

(58) Field of Classification Search
CPC ......................................... H04W 52/00–52/60
See application file for complete search history.

(56) References Cited

U.S. PATENT DOCUMENTS 9,491,708 B2   11/2016   Jung et al.
2016/0353343 A1   12/2016   Rahman et al.
(Continued)

FOREIGN PATENT DOCUMENTS

EP          3122122 A1     1/2017
KR       20150128246 A    11/2015
WO       2015141258 A1    9/2015

OTHER PUBLICATIONS

3GPP TS 36.101: "LTE; Evolved Universal Terrestrial Radio Access (E-UTRA); User Equipment Radio Transmission and Reception", Technical Specification, European Telecommunications Standards Institute (ETSI), 650, Route Des Lucioles, F-06921 Sophia-Antipolis Cedex, France, Version 12.5.0, Release 12, Nov. 2014, 538 Pages.
(Continued)

*Primary Examiner* — Raymond Dean
(74) *Attorney, Agent, or Firm* — Harrity & Harrity, LLP\Qualcomm

(57) ABSTRACT

Certain aspects of the present disclosure generally relate to wireless communication. In some aspects, a user equipment may decrease a first value of a transmission power of a first component carrier relative to a second value of a transmission power of a second component carrier based at least in part on the second component carrier carrying control information for the user equipment, wherein the second value of the transmission power of the second component carrier is based at least in part on a first maximum power reduction value identified for carrier aggregation. The user equipment may increase the transmission power of the second component carrier to a third value based at least in part on a second maximum power reduction value identified for single carrier. Numerous other aspects are provided.

30 Claims, 10 Drawing Sheets

(51) Int. Cl.
　　　*H04W 52/36*　　　(2009.01)
　　　*H04W 52/14*　　　(2009.01)
　　　*H04W 52/34*　　　(2009.01)
(52) U.S. Cl.
　　　CPC ....... *H04W 52/346* (2013.01); *H04W 52/367* (2013.01); *H04W 52/146* (2013.01); *H04W 52/343* (2013.01)

(56) References Cited

U.S. PATENT DOCUMENTS

2017/0230960 A1　8/2017　Frank
2017/0238262 A1　8/2017　Park

OTHER PUBLICATIONS

3GPP TS 36.213: "LTE; Evolved Universal Terrestrial Radio Access (E-UTRA); Physical Layer Procedures", Technical Specification, European Telecommunications Standards Institute (ETSI), 650, Route Des Lucioles, F-06921 Sophia-Antipolis Cedex, France, Version 12.4.0, Release 12, Feb. 2015, 227 Pages.

Lema M.A., et al., "MPR-Aware Scheduler for Carrier Aggregation Transmissions in LTE Uplink", Wireless Personal Communications, vol. 84, No. 2, Sep. 2015, pp. 1-23.

"3rd Generation Partnership Project; Technical Specification Group Radio Access Network; Evolved Universal Terrestrial Radio Access (E-UTRA); User Equipment (UE) Radio Transmission and Reception (Release 14)", 3GPP Standard; 3GPP TS 36.101, 3rd Generation Partnership Project (3GPP), Mobile Competence Centre, 650, Route Des Lucioles, F-06921, Sophia-Antipolis Cedex, France, vol. RAN WG4, No. V14.1.0, Oct. 12, 2016, pp. 25-338, XP051173079, [retrieved on Oct. 12, 2016].

International Search Report and Written Opinion—PCT/US2017/057620—ISA/EPO—dated Dec. 12, 2017.

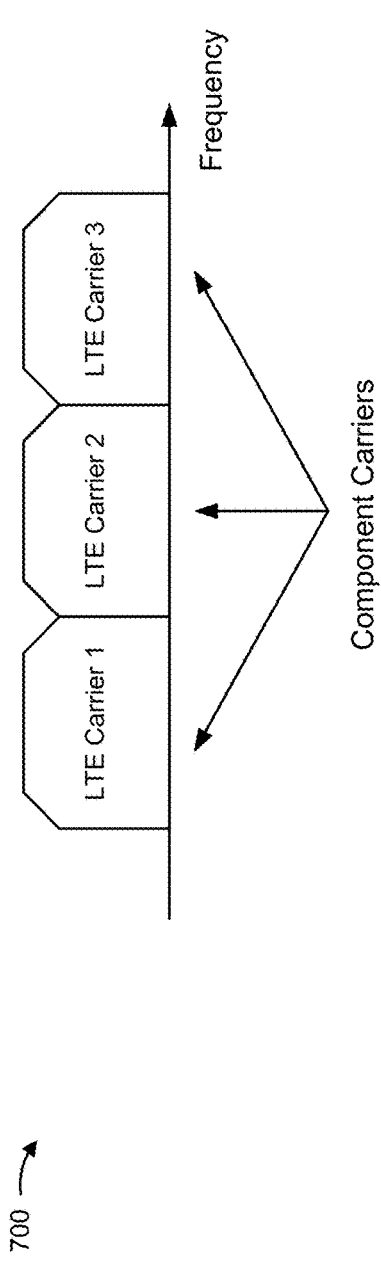
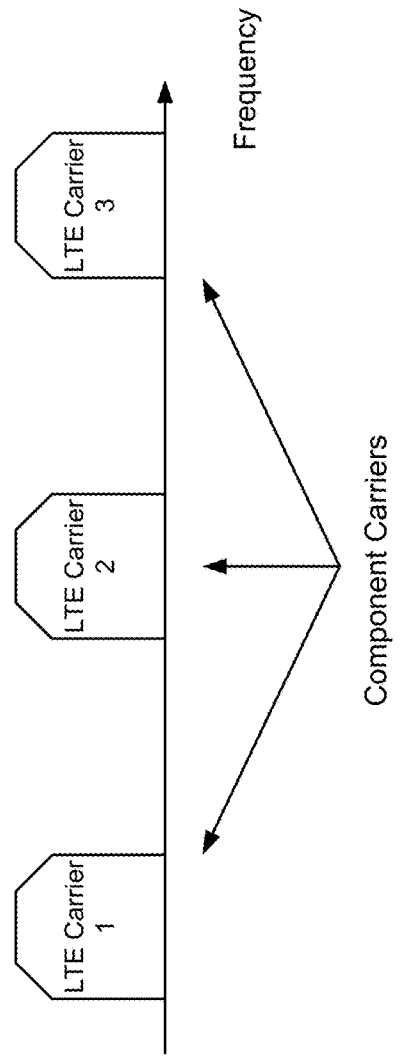
Fig 7A
Fig. 7B

TECHNIQUES AND APPARATUSES FOR ADJUSTING TRANSMISSION POWER FOR POWER-LIMITED UPLINK CARRIER AGGREGATION SCENARIOS

CROSS-REFERENCE TO RELATED APPLICATION UNDER 35 U.S.C. 119

This application claims priority to Provisional Patent Application No. 62/421,748, filed Nov. 14, 2016, entitled "TECHNIQUES AND APPARATUSES FOR ADJUSTING TRANSMISSION POWER FOR POWER-LIMITED UPLINK CARRIER AGGREGATION SCENARIOS," which is hereby expressly incorporated by reference herein.

FIELD OF THE DISCLOSURE

Aspects of the present disclosure generally relate to wireless communication, and more particularly to techniques and apparatuses for adjusting transmission power for power-limited uplink carrier aggregation scenarios.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication performed by a user equipment may include decreasing a first value of a transmission power of a first component carrier relative to a second value of a transmission power of a second component carrier based at least in part on the second component carrier carrying control information for the user equipment, wherein the second value of the transmission power of the second component carrier is based at least in part on a first maximum power reduction value identified for carrier aggregation. The method may include increasing the transmission power of the second component carrier to a third value based at least in part on a second maximum power reduction value identified for single carrier.

In some aspects, a user equipment may include one or more processors configured to decrease a first value of a transmission power of a first component carrier relative to a second value of a transmission power of a second component carrier based at least in part on the second component carrier carrying control information for the user equipment, wherein the second value of the transmission power of the second component carrier is based at least in part on a first maximum power reduction value identified for carrier aggregation. The one or more processors may be configured to increase the transmission power of the second component carrier to a third value based at least in part on a second maximum power reduction value identified for single carrier.

In some aspects, a non-transitory computer-readable medium may store one or more instructions for wireless communication. The one or more instructions, when executed by one or more processors of a user equipment, may cause the one or more processors to decrease a first value of a transmission power of a first component carrier relative to a second value of a transmission power of a second component carrier based at least in part on the second component carrier carrying control information for the user equipment, wherein the second value of the transmission power of the second component carrier is based at least in part on a first maximum power reduction value identified for carrier aggregation. The one or more instructions, when executed by the one or more processors, may cause the one or more processors to increase the transmission power of the second component carrier to a third value based at least in part on a second maximum power reduction value identified for single carrier.

In some aspects, an apparatus for wireless communication may include means for decreasing a first value of a transmission power of a first component carrier relative to a second value of a transmission power of a second component carrier based at least in part on the second component carrier carrying control information for the apparatus, wherein the second value of the transmission power of the second component carrier is based at least in part on a first maximum power reduction value identified for carrier aggregation. The apparatus may include means for increasing the transmission power of the second component carrier to a third value based at least in part on a second maximum power reduction value identified for single carrier.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A and 7B are diagrams illustrating example carrier aggregation types, in accordance with various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/ or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
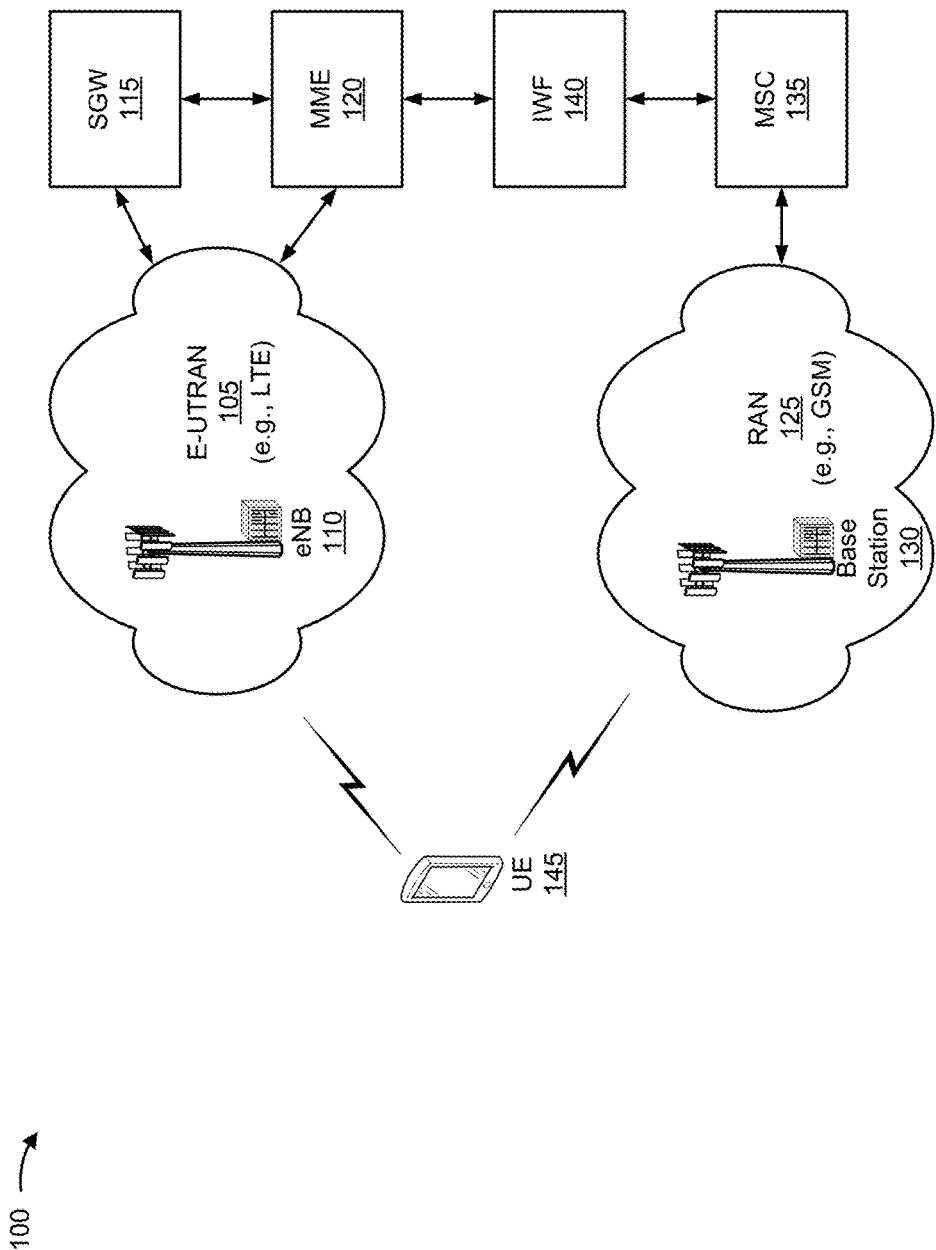
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP Technical Specification (TS) 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, etc. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, etc.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
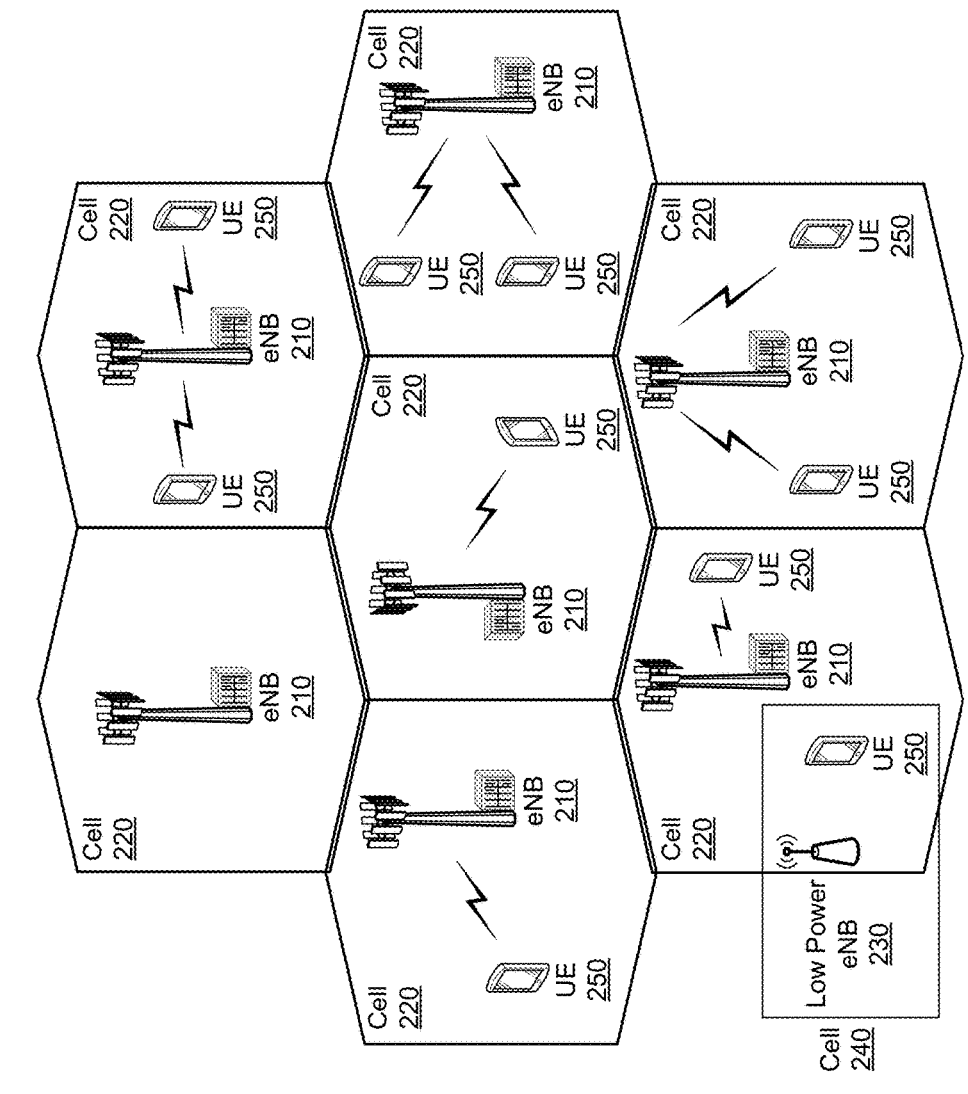
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, orthogonal frequency division multiplexing (OFDM) is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
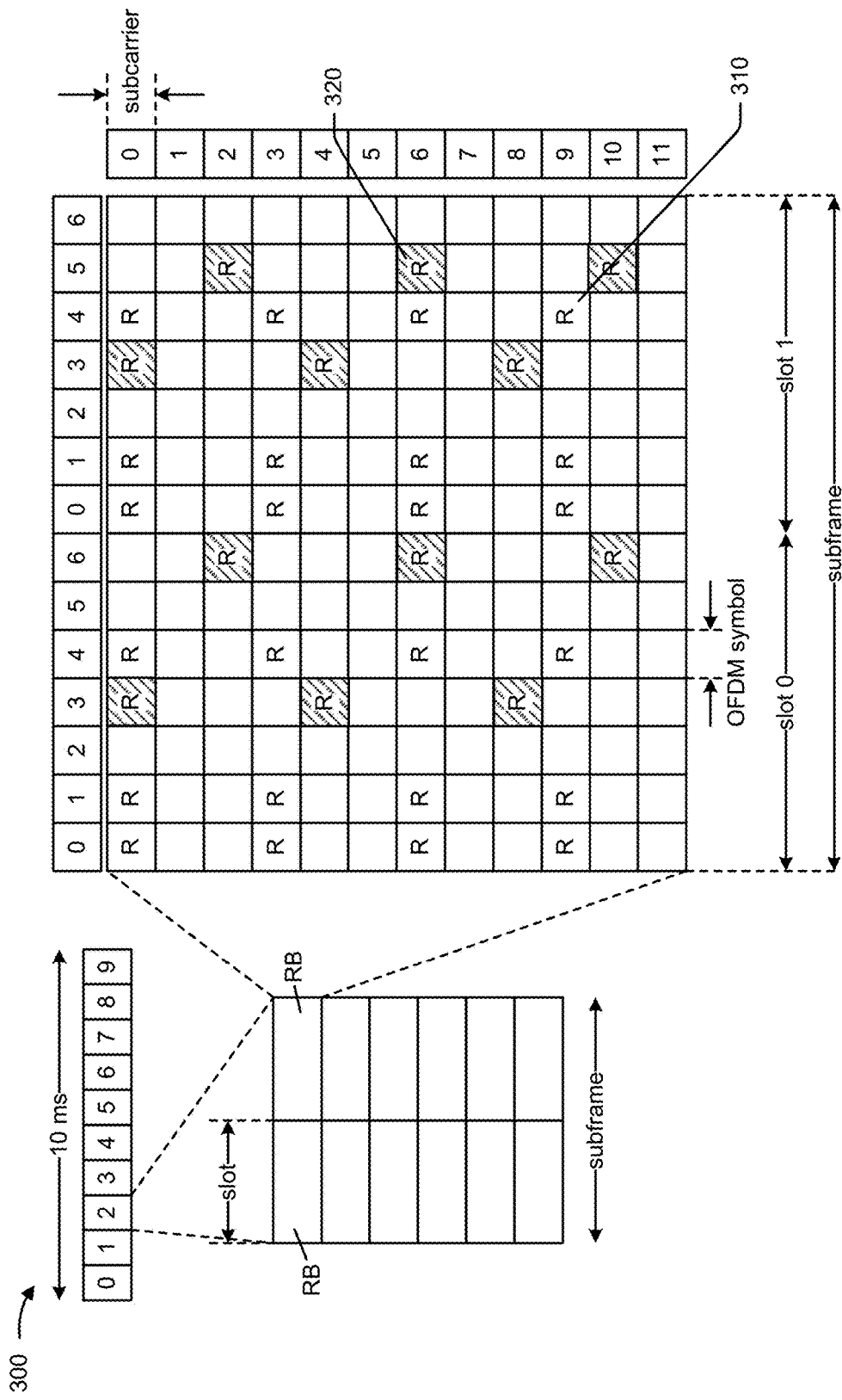
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical hybrid automatic repeat request (HARQ) Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value.

Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
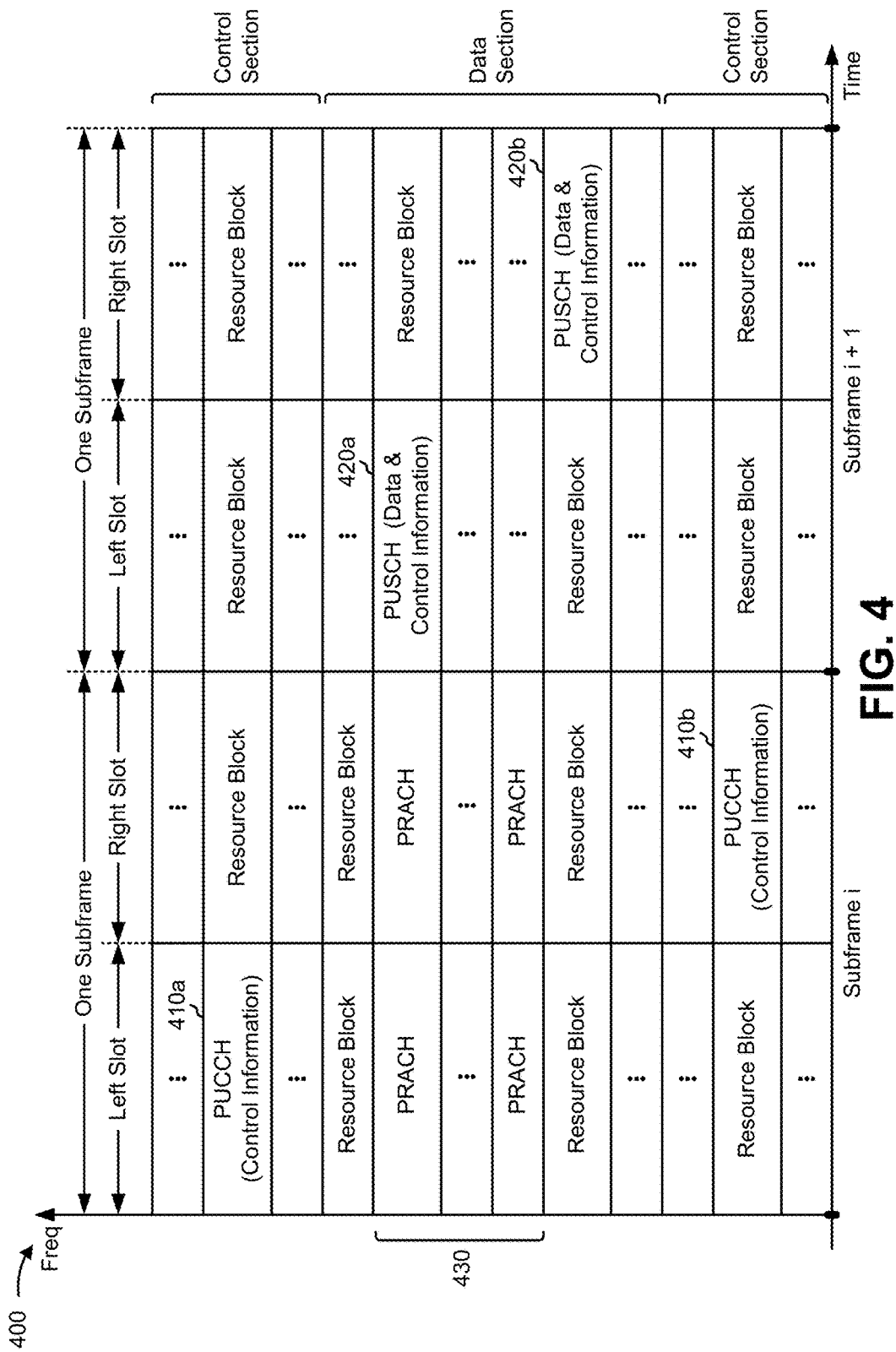
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
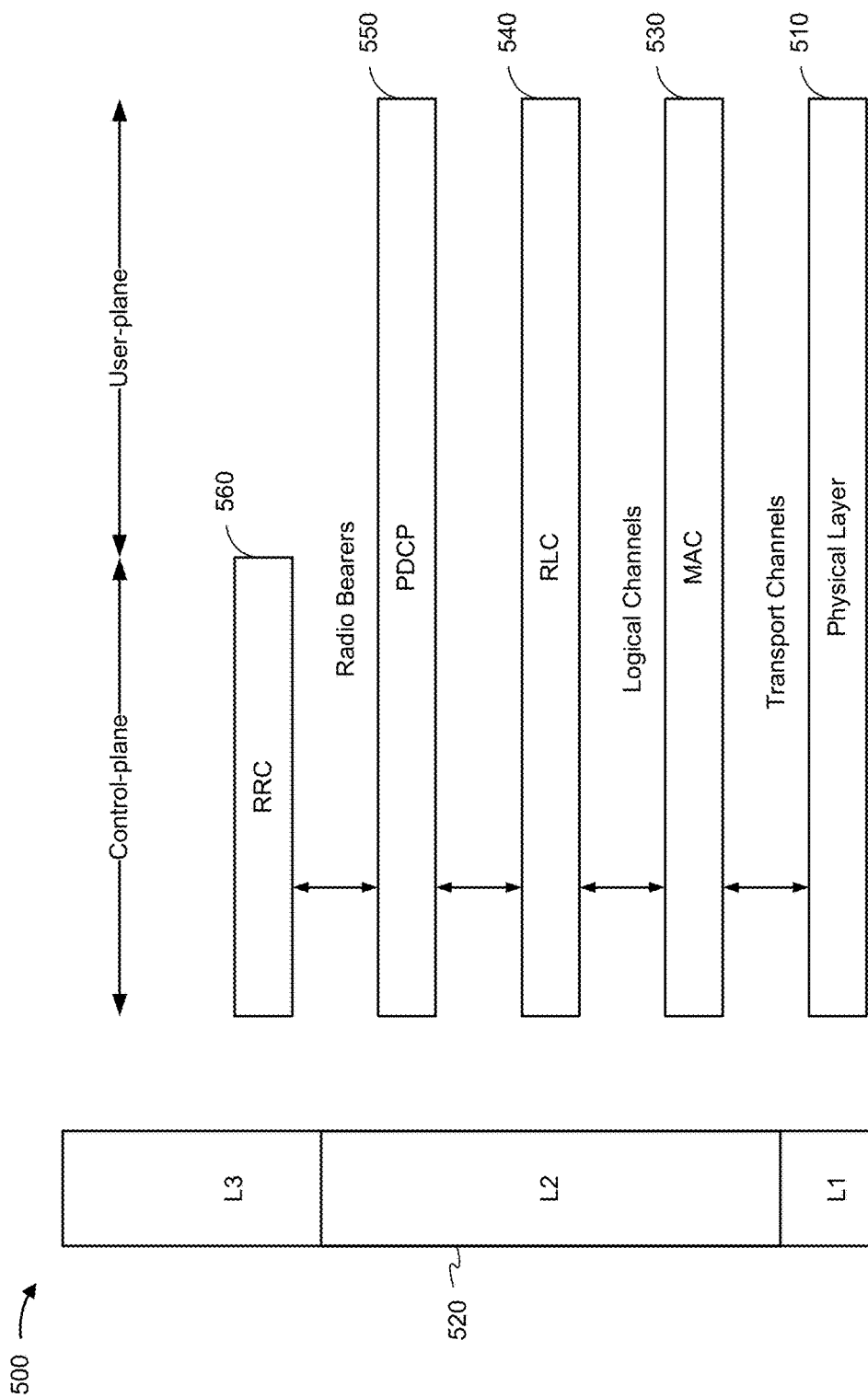
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, etc.).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
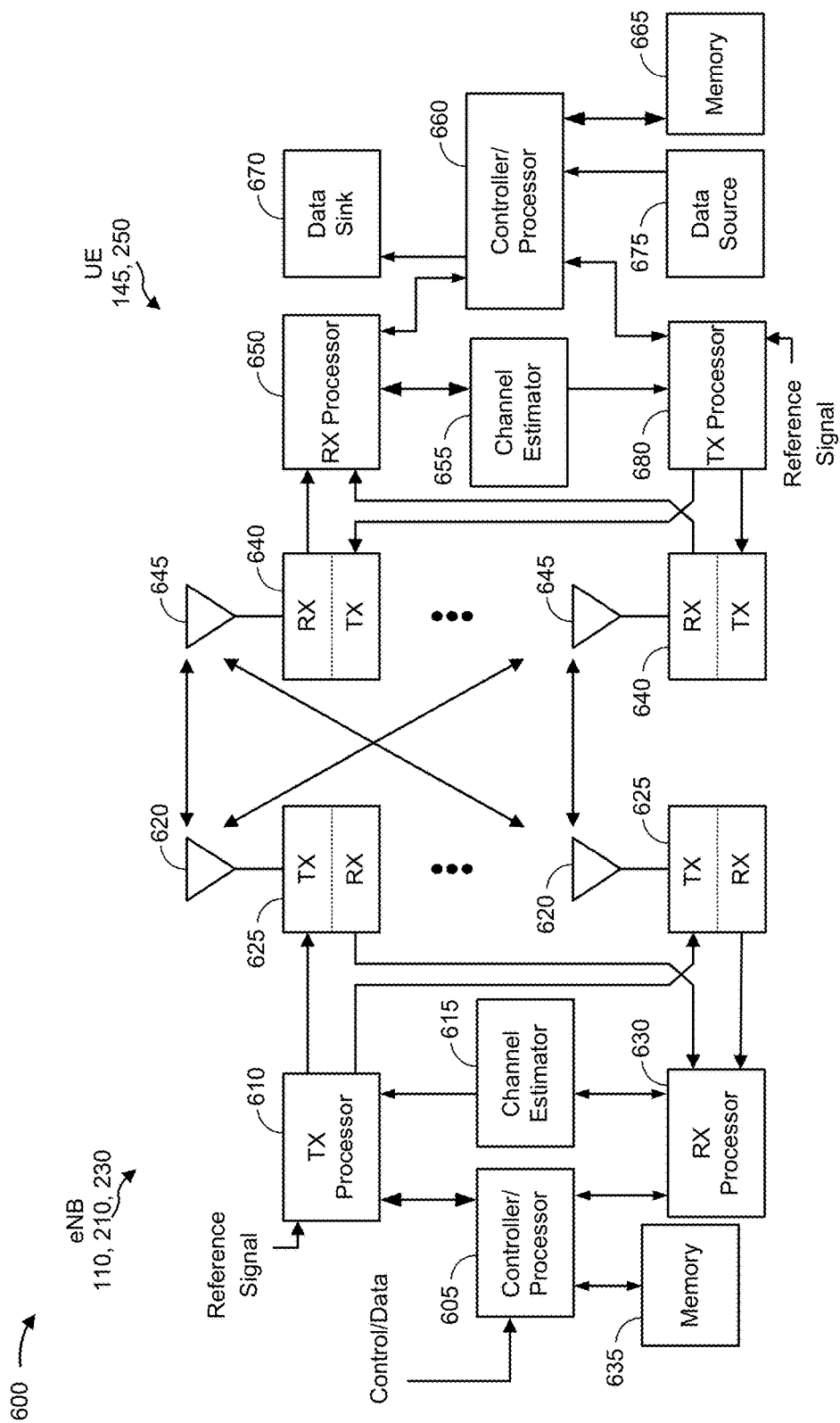
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates a radio frequency (RF) carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the control/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

One or more components of UE 145, 250 may be configured to perform adjusting transmit power for power-limited uplink carrier aggregation scenarios, as described in more detail elsewhere herein. For example, the controller/processor 660 and/or other processors and modules of UE 145, 250 may perform or direct operations of, for example, example process 900 of FIG. 9, and/or other processes as described herein. In some aspects, one or more of the components shown in FIG. 6 may be employed to perform example process 900, and/or other processes for the techniques described herein.

In some aspects, UE 145, 250 may include means for decreasing a first value of a transmission power of a first component carrier relative to a second value of a transmission power of a second component carrier based at least in part on the second component carrier carrying control information; means for increasing the transmission power of the second component carrier to a third value based at least in part on a second maximum power reduction value identified for single carrier; means for identifying the first maximum power reduction value for carrier aggregation; means for identifying the second maximum power reduction value for single carrier after decreasing the first value of the transmission power of the first component carrier; means for dropping the first component carrier due to priority being given to the second component carrier; means for decreasing the first value of the transmission power of the first component carrier to substantially zero, and/or the like. In some aspects, such means may include one or more components of UE 145, 250 described in connection with FIG. 6.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

FIGS. 7A and 7B are illustrations of examples 700 of carrier aggregation types, in accordance with various aspects of the present disclosure.

In some aspects, UE 145, 250 may use spectrum of up to 20 MHz bandwidths allocated in a carrier aggregation of up to a total of 100 MHz (e.g., 5 component carriers) used for transmission and reception. For an LTE-Advanced enabled wireless communication system, two types of carrier aggregation (CA) methods may be used, contiguous CA and non-contiguous CA, which are illustrated in FIGS. 7A and 7B, respectively. Contiguous CA occurs when multiple available component carriers are adjacent to each other (e.g., as illustrated in FIG. 7A). On the other hand, non-contiguous CA occurs when multiple non-adjacent available component carriers are separated along the frequency band (e.g., as illustrated in FIG. 7B) and/or are included in different frequency bands.

Both non-contiguous and contiguous CA may aggregate multiple component carriers to serve a single unit of LTE-Advanced UEs 145, 250. In various examples, UE 145, 250 operating in a multicarrier system (e.g., also referred to as carrier aggregation) is configured to aggregate certain functions of multiple carriers, such as control and feedback functions, on the same carrier, which may be referred to as a primary carrier. The remaining carriers that depend on the primary carrier for support may be referred to as secondary carriers. For example, UE 145, 250 may aggregate control functions such as those provided by the optional dedicated channel (DCH), the nonscheduled grants, a physical uplink control channel (PUCCH), and/or a physical downlink control channel (PDCCH).

As indicated above, FIGS. 7A and 7B are provided as examples. Other examples are possible and may differ from what was described in connection with FIGS. 7A and 7B.

A UE (e.g., UE 145, 250) may configure a transmission power of an uplink signal based at least in part on feedback from a base station such as an eNB (e.g., eNB 110, 210, 230), channel conditions, a modulation scheme of the UE, and/or the like. For example, the UE may receive feedback from the eNB indicating to increase or decrease transmission power based at least in part on whether reception or decoding of previous signals, transmitted by the UE, is successful. The UE may increase transmission power when reception or decoding of the previous signals is poor or unsuccessful, and may decrease transmission power when reception or decoding of the previous signals is successful.

In some aspects, the UE may be associated with a maximum output power. The maximum output power may identify a maximum transmission power at which the UE is permitted to transmit signals. For example, a UE operating in a 3GPP frequency band (e.g., an LTE UE) may, for example, be a Power class 3 UE, and the maximum output power associated with such a UE may be approximately 23 decibel-milliwatts (dBm) within a particular tolerance that is determined according to the 3GPP frequency band in which the UE operates. When uplink performance or channel conditions of the UE are sufficiently poor, the transmission power of the UE may approach or reach the maximum output power as a result of, for example, the eNB feedback process. A scenario in which the transmission power approaches or reaches the maximum output power may be referred to as a power-limited uplink scenario.

In some aspects, the UE may adjust the transmission power value specified by the eNB based at least in part on a maximum power reduction (MPR) value to determine a transmission power of the UE. For example, due to the flexibility of bandwidth and modulation of the LTE air interface, the UE may adjust the transmission power value that is actually used by the UE to a value below the value indicated by the eNB. The MPR value used to decrease the transmission power value may be determined using one or more criteria, such as whether the uplink signal is associated with single carrier or carrier aggregation, as well as other criteria described in more detail below. For example, the UE may use a higher MPR value, and therefore a lower transmission power value, for signals associated with carrier aggregation than for signals associated with a single carrier. By decreasing the transmission power value, the UE may improve uplink performance and reduce interference on the LTE air interface.

In some aspects, the UE may configure a primary component carrier (PCC) and a secondary component carrier (SCC) for uplink and/or downlink traffic of the UE in accordance with CA. The UE may transmit uplink signals associated with the PCC and/or the SCC at particular transmission powers. In some aspects, the UE may adjust the transmission powers associated with the PCC and/or the SCC according to priority of the PCC and/or the SCC. For example, consider a situation where uplink performance or channel conditions are sufficiently poor to cause both the PCC and the SCC to be configured to transmit at a maximum output power for a serving cell associated with the PCC. Assume that uplink control information (UCI) of the PCC and/or the SCC is carried by the PCC. In such a case, the UE may give priority to the PCC, which carries the UCI, over the SCC. Accordingly, the UE may reduce the transmission power of the SCC to a lower value (e.g., to zero, to substantially zero, and/or the like) to ensure that the UE can provide sufficient power for the PCC. This process may be referred to as priority-based power scaling.

When determining transmission strengths of a PCC and an SCC, in a case where the transmission power of the SCC has been reduced (e.g., to zero, to substantially zero, and/or the like) due to priority-based power scaling, the UE may employ an MPR value for the PCC that is determined using a carrier aggregation approach, even though the PCC is effectively being used as a single carrier (e.g., since the SCC's transmission power is zero or substantially zero). As stated above, the MPR value for carrier aggregation may be greater than the MPR value for single carrier, which may lead to greater reduction or diminution of transmission power than using an MPR value for single carrier. This may degrade uplink performance of the UE and/or impact decoding of uplink transmissions of the UE, which may be problematic in situations where uplink performance or channel conditions are sufficiently poor to cause the UE to transmit the PCC at substantially the maximum output power.

Techniques and apparatuses, described herein, relate to a situation (e.g., in a carrier aggregation scenario) where transmission power of the SCC has been reduced (e.g., to zero, to substantially zero, and/or the like) due to priority based power scaling. In such a case, the UE may accordingly determine the transmission strength of the PCC using the MPR value for single carrier (e.g., rather than the carrier aggregation MPR value). In this way, transmission strength of the PCC may be increased in such a case, thereby improving uplink performance of the UE. This may lead to better reliability in decoding the PCC during power-limited uplink carrier aggregation scenarios (e.g., when the UE is at a cell edge of the eNB, during peak uplink throughput, etc.). Furthermore, by adjusting the MPR value determination after identifying the priority-based power scaling condition, key performance indicators on the UE and/or the network side may be improved in channel conditions similar to those associated with the priority based power scaling.

Figure 8A:
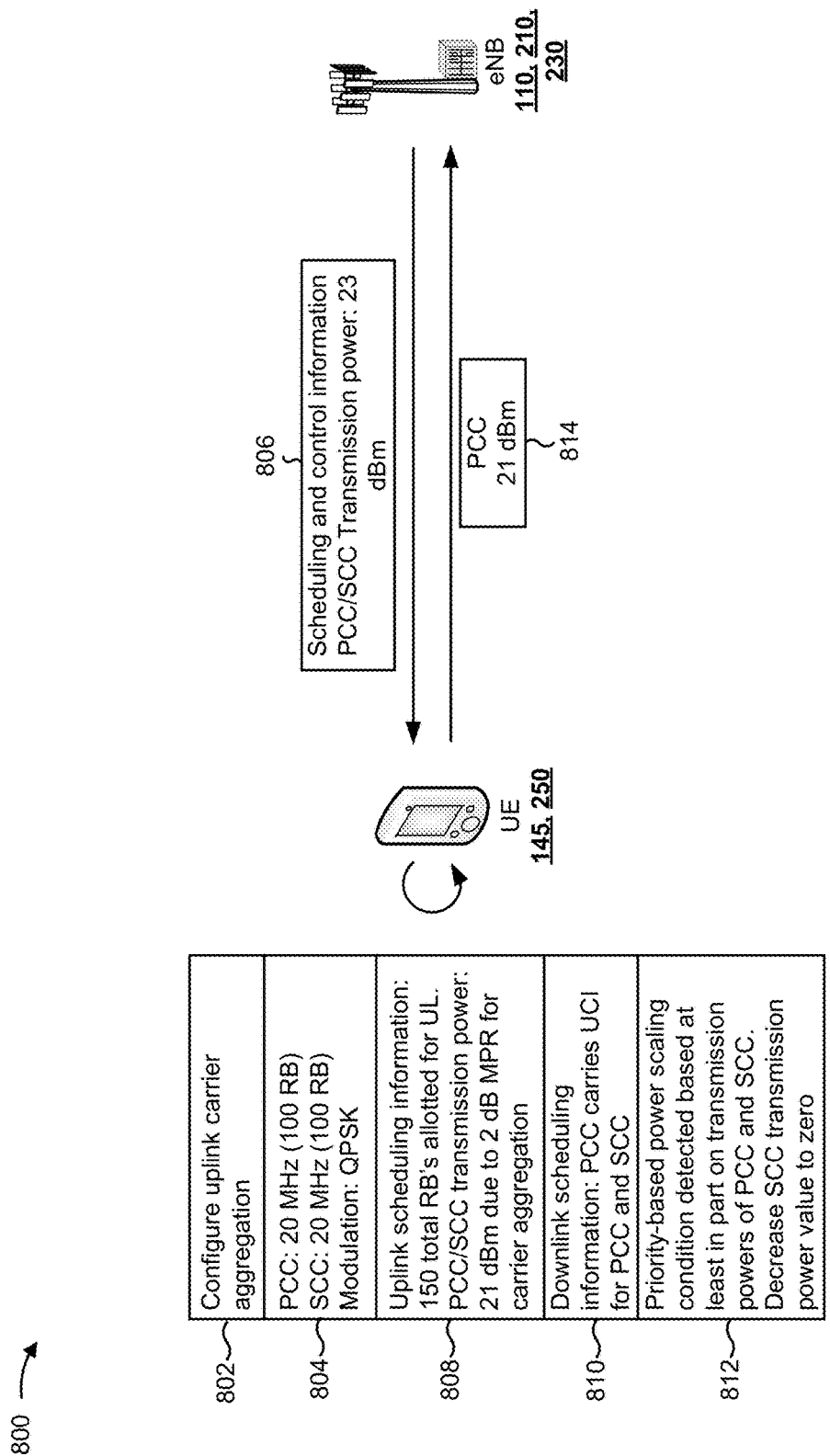
FIGS. 8A and 8B are diagrams illustrating examples of adjusting transmit power for power-limited uplink carrier aggregation scenarios, in accordance with various aspects of the present disclosure.
Figure 8B:
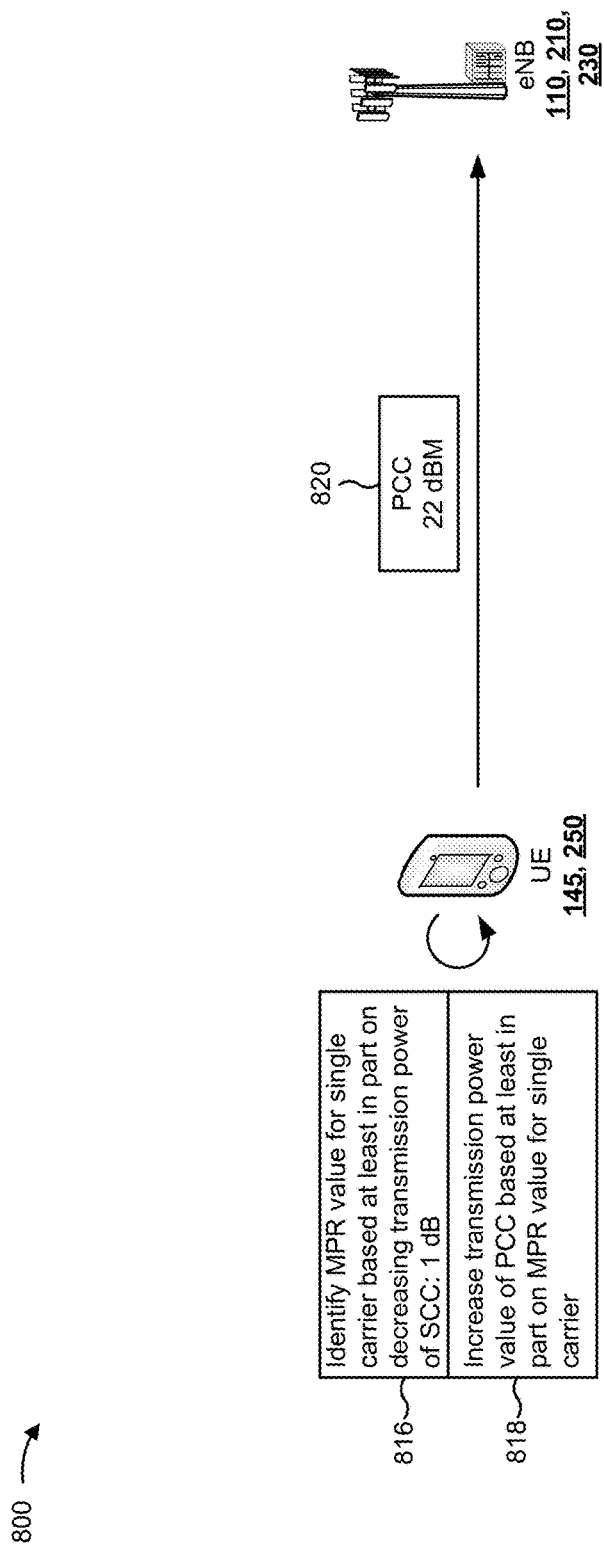

FIGS. 8A and 8B are diagrams illustrating examples 800 of adjusting transmit power for power-limited uplink carrier aggregation scenarios, in accordance with various aspects of the present disclosure.

As shown in FIG. 8A, and by reference number 802, a UE 145, 250 may configure uplink carrier aggregation with regard to component carriers provided by an eNB 110, 210, 230. As shown by reference number 804, a PCC of the UE 145, 250 may be associated with a 20 MHz bandwidth, corresponding to 100 resource blocks. As further shown, an SCC of the UE 145, 250 may also be associated with 20 MHz bandwidth corresponding to 100 resource blocks. As further shown, the PCC and the SCC are both associated with QPSK modulation schemes.

As shown by reference number 806, the UE 145, 250 may receive scheduling and control information from the eNB 110, 210 230. As shown by reference number 808, the scheduling and control information may include uplink scheduling information indicating that 150 resource blocks are allotted for the uplink (e.g., of 200 total resource blocks associated with the PCC and the SCC).

As further shown, the UE 145, 250 may determine transmission power values of 21 dBm for the PCC and the SCC based at least in part on the scheduling and control information. For example, as shown by reference number 806, the eNB 110, 210, 230 may provide transmission power control (TPC) information identifying a transmission power value of 23 dBm (e.g., equal to the maximum output power of an LTE UE 145, 250) at which the UE 145, 250 is to transmit the PCC and the SCC. In some aspects, the eNB 110, 210, 230 may specify the transmission power value based at least in part on poor channel conditions and/or uplink performance of the PCC and the SCC.

The UE 145, 250 may determine an MPR value for adjusting the transmission power specified by the eNB 110, 210, 230, to determine the transmission power value to be employed by the UE 145, 250. For example, the UE 145, 250 may use one or more LTE specifications (e.g., 3GPP specification 36.101 starting at section 6.2.3, 3GPP specification 36.213, etc.) to determine one or more MPR values, for example, for carrier aggregation based at least in part on the resource block allocation, the modulation scheme, and the uplink bandwidth. As shown here, the UE 145, 250 may determine an MPR value of 2 dB. When the MPR value of 2 dB is applied to the transmission power value of 23 dBm specified by the eNB 110, 210, 230, the UE 145, 250 may determine a transmission power value of 21 dBm, as shown in FIG. 8A.

In some aspects, and for example, the UE 145, 250 may determine the MPR value for carrier aggregation according to Table 6.2.3A-1 of 3GPP specification 36.101, as shown below:

| | Carrier aggregation bandwidth Class C | | | | | |
|---|---|---|---|---|---|---|
| Modulation | 25 RB + 100 RB | 50 RB + 100 RB | 75 RB + 75 RB | 75 RB + 100 RB | 100 RB + 100 RB | MPR (dB) |
| QPSK | >8, ≤25 | >12, ≤50 | >16, ≤75 | >16, ≤75 | >18, ≤100 | ≤1 |
| QPSK | >25 | >50 | >75 | >75 | >100 | ≤2 |
| 16 QAM | ≤8 | ≤12 | ≤16 | ≤16 | ≤18 | ≤1 |
| 16 QAM | >8, ≤25 | >12, ≤50 | >16, ≤75 | >16, ≤75 | >18, 100 | ≤2 |
| 16 QAM | >25 | >50 | >75 | >75 | >100 | ≤3 |

Here, the UE 145, 250 may identify the MPR value of 2 dB according to the lower QPSK row of Table 6.2.3A-1. For example, the PCC and the SCC are each associated with a QPSK modulation scheme, respective bandwidths of 100 RB (e.g., 100 RB+100 RB), and a cumulative resource block allocation of 150 RBs (e.g., >100). Therefore, the UE 145, 250 selects the MPR value of ≤2 dB, and uses 2 dB as the MPR value.

The MPR value of 2 dB for carrier aggregation, determined in connection with FIG. 8A, may be different than if the UE 145, 250 determined an MPR value for a single carrier. For example, the UE 145, 250 may determine an MPR value of 1 dB for single carrier, which may lead to a transmission power value of 22 dBm, as described in more detail below. This higher transmission power (e.g., determined using the single carrier approach) may lead to improved network performance with regard to the UE 145, 250 when only one component carrier (e.g., the PCC) is transmitted at such a transmission power value, thus improving performance of the UE 145, 250 in a power-limited uplink carrier aggregation scenario.

As shown by reference number 810, the scheduling and control information (at reference number 806) may identify downlink scheduling information indicating that the PCC is scheduled to carry uplink control information for the PCC and the SCC.

As shown by reference number 812, the UE 145, 250 may identify a priority-based power scaling condition based at least in part on the transmission power values of the PCC and the SCC. For example, the UE 145, 250 may identify the priority-based power scaling condition when the transmission power values satisfy a threshold (e.g., when the PCC and the SCC are each to be transmitted at 70 percent of the maximum output power of the UE 145, 250, at 90 percent of the maximum output power of the UE 145, 250, at 100 percent of the maximum output power of the UE 145, 250, and/or the like). In some aspects, the UE 145, 250 may identify the priority-based power scaling condition during a power-limited uplink carrier aggregation scenario, such as a scenario when the UE 145, 250 is transmitting uplink carrier aggregation traffic at a peak uplink throughput, when the UE 145, 250 is isolated from the eNB 110, 210, 230, when the UE 145, 250 is located at a cell edge of the eNB 110, 210, 230, and/or the like.

As further shown, the UE 145, 250 may decrease the SCC transmission power value, for example, to zero based at least in part on identifying the priority-based power scaling condition and based at least in part on the PCC carrying the UCI to be transmitted on the uplink. However, the MPR value for the PCC may be equal to 2 dB when the MPR value is computed for carrier aggregation, which leads to a transmission power (e.g., configured by the UE 145, 250) of the PCC of 21 dBm, as shown by reference number 814. Therefore, the UE 145, 250 may transmit the PCC at diminished power as compared to a single carrier case (e.g., with an MPR value of 1 dB). Transmitting the PCC at diminished power may lead to diminished reception of the PCC at the eNB 110, 210, 230 in a power-limited uplink carrier aggregation scenario. Thus, as described in connection with FIG. 8B, below, it may be beneficial to use a single carrier MPR value to compute the transmission power.

As shown in FIG. 8B, and by reference number 816, the UE 145, 250 may identify an MPR value computed for single carrier based at least in part on decreasing the transmission power of the SCC due to identifying the priority-based power scaling condition. For example, the MPR value computed for single carrier may be 1 dB. In some aspects, and for example, the UE may determine the MPR value for single carrier according to Table 6.2.3-1 of 3GPP specification 36.101, as shown below:

| Modulation | Channel bandwidth/Transmission Bandwidth ($N_{RB}$) | | | | | | MPR (dB) |
|---|---|---|---|---|---|---|---|
| | 1.4 MHz | 3 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

Here, the UE 145, 250 may identify the MPR value of 1 dB according to the QPSK row of Table 6.2.3-1. For example, the PCC is associated with a QPSK modulation scheme and a bandwidth of 100 RB (e.g., 20 MHz). Assume that the PCC is associated with a resource block allocation of 75 RB of the 150 RB of the PCC and the SCC (e.g., $N_{RB}$>18). Therefore, the UE 145, 250 selects the MPR value of ≤1 dB, and uses 1 dB as the MPR value.

As shown by reference number 818, the UE 145, 250 may increase the transmission power value of the PCC based at least in part on the MPR value for single carrier. For example, as shown by reference number 820, the UE 145, 250 may increase the transmission power value from a value of 21 dBm, shown in FIG. 8A, to 22 dBm, shown in FIG. 8B. In some aspects, the UE 145, 250 may configure the transmission power value according to the MPR value for single carrier. For example, rather than increasing the transmission power from 21 dBm to 22 dBm, the UE 145, 250 may simply use a transmission power of 22 dBm. In this way, the UE 145, 250 configures transmission power of the PCC for single carrier in a situation where transmission power of the SCC has been dropped or diminished (e.g., for power-limited uplink carrier aggregation scenarios). Thus, uplink performance of the UE 145, 250 is improved.

As indicated above, FIGS. 8A and 8B are provided as examples. Other examples are possible and may differ from what was described with respect to FIGS. 8A and 8B.

Figure 9:
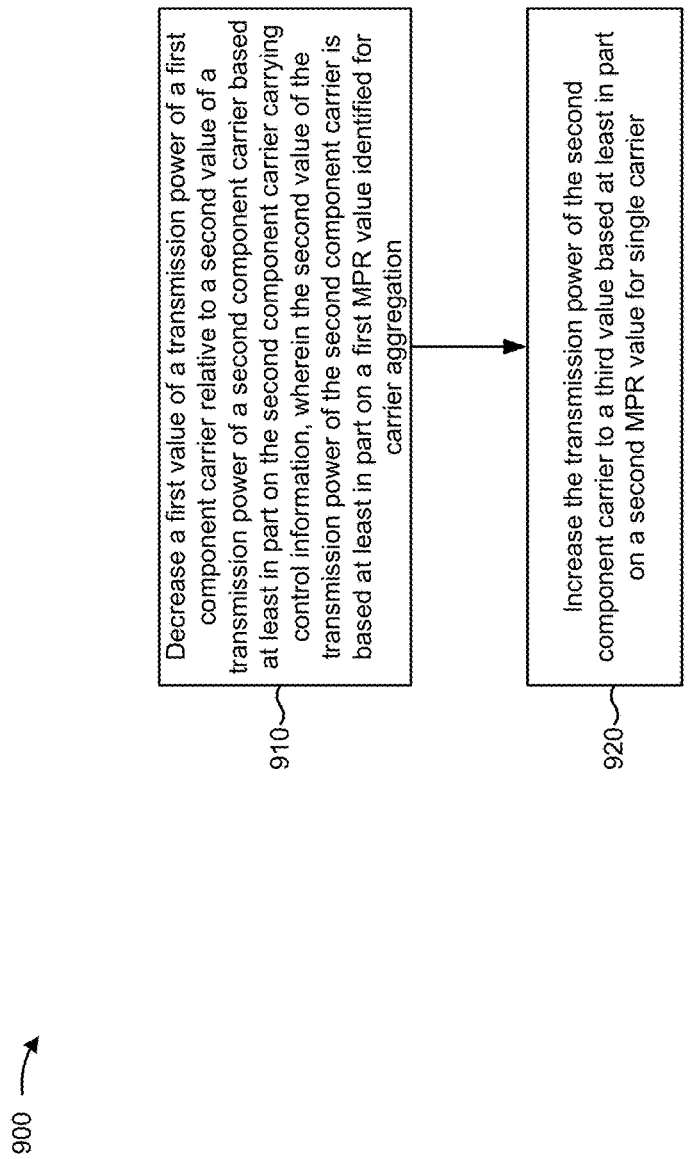
FIG. 9 is a diagram illustrating an example process performed, for example, by a user equipment, in accordance with various aspects of the present disclosure.

FIG. 9 is a diagram illustrating an example process 900 performed, for example, by a user equipment, in accordance with various aspects of the present disclosure. Example process 900 is an example where a user equipment (e.g., UE 145, 250) performs adjusting of transmit power for power-limited uplink carrier aggregation scenarios.

As shown in FIG. 9, in some aspects, process 900 may include decreasing a first value of a transmission power of a first component carrier relative to a second value of a transmission power of a second component carrier based at least in part on the second component carrier carrying control information, wherein the second value of the transmission power of the second component carrier is based at least in part on a first MPR value identified for carrier aggregation (block 910). For example, the user equipment may decrease a first value of a transmission power of a first component carrier (e.g., an SCC) relative to a second value of a transmission power of a second component carrier (e.g., a PCC) based at least in part on the second component carrier carrying control information. The second value of the transmission power (e.g., configured by the UE) of the second component carrier may be based at least in part on a first MPR value identified for carrier aggregation.

As shown in FIG. 9, in some aspects, process 900 may include increasing the transmission power of the second component carrier to a third value based at least in part on a second MPR value identified for single carrier (block 920). For example, the user equipment may increase the transmission power of the second component carrier (e.g., the PCC) to a third value based at least in part on a second MPR value identified for single carrier.

In some aspects, the user equipment may identify the first MPR value for carrier aggregation. In some aspects, the user equipment may identify the second MPR value for single carrier after decreasing the first value of the transmission power of the first component carrier, wherein decreasing the first value of the transmission power of the first component carrier includes dropping the first component carrier due to priority being given to the second component carrier.

In some aspects, the user equipment may decrease the first value of the transmission power of the first component carrier relative to the second value of the transmission power of the second component carrier based at least in part on a total transmission power of the first component carrier and the second component carrier satisfying a threshold.

In some aspects, the second component carrier may carry uplink control information of at least one of the first component carrier or the second component carrier.

In some aspects, the user equipment may decrease the first value of the transmission power of the first component carrier to substantially zero.

In some aspects, the first component carrier may include a secondary component carrier and the second component carrier may include a primary component carrier.

In some aspects, at least the second value of the transmission power of the second component carrier may be determined based at least in part on at least one of: a resource block allocation of the first component carrier and the second component carrier; an uplink bandwidth of the first component carrier and the second component carrier; or modulation types of the first component carrier and the second component carrier.

In some aspects, at least the third value of the transmission power of the second component carrier may be determined based at least in part on at least one of an uplink bandwidth of the second component carrier, or a modulation type of the second component carrier.

In some aspects, the second value of the transmission power of the second component carrier may be a first configured maximum output power for a serving cell associated with the second component carrier, the first configured maximum output power (e.g., configured by the UE) may be based at least in part on the first MPR value. The third value of the transmission power of the second component carrier may be a second configured maximum output power for a serving cell associated with the second component carrier, the second configured maximum output power (e.g., configured by the UE) may be based at least in part on the second MPR value.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects. In aspects, an MPR value may refer to at least one of a regular MPR value, an A-MPR (Additional Maximum Power Reduction) value, or a P-MPR (Power Management Maximum Power Reduction) value.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
    decreasing, by a user equipment, a first value of a transmission power of a first component carrier relative to a second value of a transmission power of a second component carrier based at least in part on the second component carrier carrying control information for the user equipment,
        wherein the second value of the transmission power of the second component carrier is based at least in part on a first maximum power reduction value identified for carrier aggregation; and
    increasing, by the user equipment, the transmission power of the second component carrier to a third value based at least in part on a second maximum power reduction value identified for single carrier.

2. The method of claim 1, further comprising:
    identifying the first maximum power reduction value for carrier aggregation; and
    identifying the second maximum power reduction value for single carrier after decreasing the first value of the transmission power of the first component carrier,
        wherein decreasing the first value of the transmission power of the first component carrier includes dropping the first component carrier due to priority being given to the second component carrier.

3. The method of claim 1, wherein decreasing the first value of the transmission power of the first component carrier relative to the second value of the transmission power of the second component carrier comprises:
    decreasing the first value of the transmission power of the first component carrier relative to the second value of the transmission power of the second component carrier based at least in part on a total transmission power of the first component carrier and the second component carrier satisfying a threshold.

4. The method of claim 1, wherein the second component carrier carries uplink control information of at least one of the first component carrier or the second component carrier.

5. The method of claim 1, wherein decreasing the first value of the transmission power of the first component carrier relative to the second value of the transmission power of the second component carrier comprises:
    decreasing the first value of the transmission power of the first component carrier to substantially zero.

6. The method of claim 1, wherein the first component carrier is a secondary component carrier and the second component carrier is a primary component carrier.

7. The method of claim 1, wherein at least the second value of the transmission power of the second component carrier is determined based at least in part on at least one of:
    a resource block allocation of the first component carrier and the second component carrier,
    an uplink bandwidth of the first component carrier and the second component carrier, or
    modulation types of the first component carrier and the second component carrier.

8. The method of claim 1, wherein at least the third value of the transmission power of the second component carrier is determined based at least in part on at least one of:
an uplink bandwidth of the second component carrier, or
a modulation type of the second component carrier.

9. The method of claim 1, wherein:
the second value of the transmission power of the second component carrier is a first configured maximum output power for a serving cell associated with the second component carrier, the first configured maximum output power is based at least in part on the first maximum power reduction value; and
the third value of the transmission power of the second component carrier is a second configured maximum output power for a serving cell associated with the second component carrier, the second configured maximum output power is based at least in part on the second maximum power reduction value.

10. A user equipment, comprising:
a memory; and
one or more processors operatively coupled to the memory, the one or more processors configured to:
decrease a first value of a transmission power of a first component carrier relative to a second value of a transmission power of a second component carrier based at least in part on the second component carrier carrying control information for the user equipment,
wherein the second value of the transmission power of the second component carrier is based at least in part on a first maximum power reduction value identified for carrier aggregation; and
increase the transmission power of the second component carrier to a third value based at least in part on a second maximum power reduction value identified for single carrier.

11. The user equipment of claim 10, wherein the one or more processors are further configured to:
identify the first maximum power reduction value for carrier aggregation; and
identify the second maximum power reduction value for single carrier after decreasing the first value of the transmission power of the first component carrier; and
wherein the one or more processors, when decreasing the first value of the transmission power of the first component carrier, are configured to:
drop the first component carrier due to priority being given to the second component carrier.

12. The user equipment of claim 10, wherein the one or more processors, when decreasing the first value of the transmission power of the first component carrier relative to the second value of the transmission power of the second component carrier, are configured to:
decrease the first value of the transmission power of the first component carrier relative to the second value of the transmission power of the second component carrier based at least in part on a total transmission power of the first component carrier and the second component carrier satisfying a threshold.

13. The user equipment of claim 10, wherein the second component carrier carries uplink control information of at least one of the first component carrier or the second component carrier.

14. The user equipment of claim 10, wherein the one or more processors, when decreasing the first value of the transmission power of the first component carrier relative to the second value of the transmission power of the second component carrier, are configured to:
decrease the first value of the transmission power of the first component carrier to substantially zero.

15. The user equipment of claim 10, wherein the first component carrier is a secondary component carrier and the second component carrier is a primary component carrier.

16. The user equipment of claim 10, wherein at least the second value of the transmission power of the second component carrier is determined based at least in part on at least one of:
a resource block allocation of the first component carrier and the second component carrier,
an uplink bandwidth of the first component carrier and the second component carrier, or
modulation types of the first component carrier and the second component carrier.

17. The user equipment of claim 10, wherein at least the third value of the transmission power of the second component carrier is determined based at least in part on at least one of:
an uplink bandwidth of the second component carrier, or
a modulation type of the second component carrier.

18. The user equipment of claim 10, wherein:
the second value of the transmission power of the second component carrier is a first configured maximum output power for a serving cell associated with the second component carrier,
the first configured maximum output power being based at least in part on the first maximum power reduction value; and
the third value of the transmission power of the second component carrier is a second configured maximum output power for a serving cell associated with the second component carrier,
the second configured maximum output power being based at least in part on the second maximum power reduction value.

19. An apparatus for wireless communication, comprising:
means for decreasing a first value of a transmission power of a first component carrier relative to a second value of a transmission power of a second component carrier based at least in part on the second component carrier carrying control information for the apparatus,
wherein the second value of the transmission power of the second component carrier is based at least in part on a first maximum power reduction value identified for carrier aggregation; and
means for increasing the transmission power of the second component carrier to a third value based at least in part on a second maximum power reduction value identified for single carrier.

20. The apparatus of claim 19, further comprising:
means for identifying the first maximum power reduction value for carrier aggregation; and
means for identifying the second maximum power reduction value for single carrier after decreasing the first value of the transmission power of the first component carrier; and
wherein the means for decreasing the first value of the transmission power of the first component carrier comprises:
means for dropping the first component carrier due to priority being given to the second component carrier.

21. The apparatus of claim 19, wherein the means for decreasing the first value of the transmission power of the first component carrier relative to the second value of the transmission power of the second component carrier comprises:
    means for decreasing the first value of the transmission power of the first component carrier relative to the second value of the transmission power of the second component carrier based at least in part on a total transmission power of the first component carrier and the second component carrier satisfying a threshold.

22. The apparatus of claim 19, wherein the second component carrier carries uplink control information of at least one of the first component carrier or the second component carrier.

23. The apparatus of claim 19, wherein:
    the second value of the transmission power of the second component carrier is a first configured maximum output power for a serving cell associated with the second component carrier, the first configured maximum output power is based at least in part on the first maximum power reduction value; and
    the third value of the transmission power of the second component carrier is a second configured maximum output power for a serving cell associated with the second component carrier, the second configured maximum output power is based at least in part on the second maximum power reduction value.

24. The apparatus of claim 19, wherein the first component carrier is a secondary component carrier and the second component carrier is a primary component carrier.

25. A non-transitory computer-readable medium storing one or more instructions for wireless communications, the one or more instructions comprising:
    one or more instructions that, when executed by one or more processors of a user equipment, cause the one or more processors to:
        decrease a first value of a transmission power of a first component carrier relative to a second value of a transmission power of a second component carrier based at least in part on the second component carrier carrying control information for the user equipment,
            wherein the second value of the transmission power of the second component carrier is based at least in part on a first maximum power reduction value identified for carrier aggregation; and
        increase the transmission power of the second component carrier to a third value based at least in part on a second maximum power reduction value identified for single carrier.

26. The non-transitory computer-readable medium of claim 25, wherein the one or more instructions, when executed by the one or more processors, cause the one or more processors to:
    identify the first maximum power reduction value for carrier aggregation; and
    identify the second maximum power reduction value for single carrier after decreasing the first value of the transmission power of the first component carrier; and
    wherein the one or more instructions, that cause the one or more processors to decrease the first value of the transmission power of the first component carrier, cause the one or more processors to:
        drop the first component carrier due to priority being given to the second component carrier.

27. The non-transitory computer-readable medium of claim 25, wherein the one or more instructions, that cause the one or more processors to decrease the first value of the transmission power of the first component carrier relative to the second value of the transmission power of the second component carrier, cause the one or more processors to:
    decrease the first value of the transmission power of the first component carrier relative to the second value of the transmission power of the second component carrier based at least in part on a total transmission power of the first component carrier and the second component carrier satisfying a threshold.

28. The non-transitory computer-readable medium of claim 25, wherein the second component carrier carries uplink control information of at least one of the first component carrier or the second component carrier.

29. The non-transitory computer-readable medium of claim 25, wherein:
    the second value of the transmission power of the second component carrier is a first configured maximum output power for a serving cell associated with the second component carrier, the first configured maximum output power is based at least in part on the first maximum power reduction value; and
    the third value of the transmission power of the second component carrier is a second configured maximum output power for a serving cell associated with the second component carrier, the second configured maximum output power is based at least in part on the second maximum power reduction value.

30. The non-transitory computer-readable medium of claim 25, wherein the first component carrier is a secondary component carrier and the second component carrier is a primary component carrier.

* * * * *